United States Patent Office 3,708,265
Patented Jan. 2, 1973

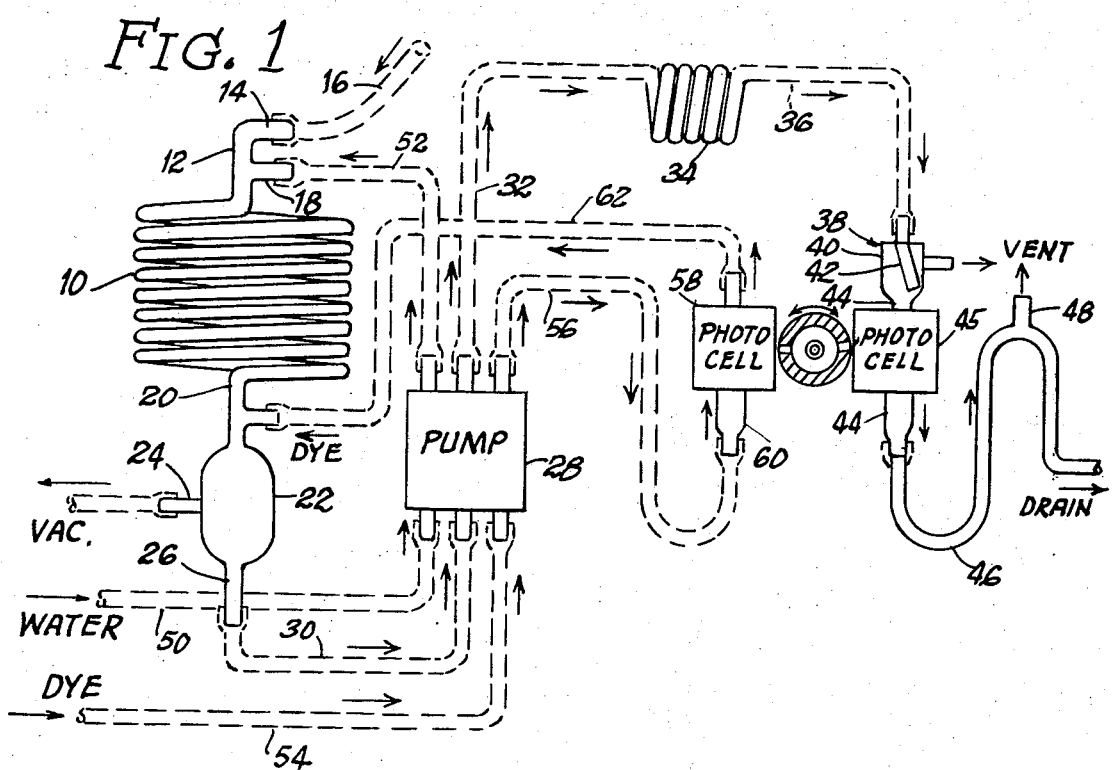
Fig. 1
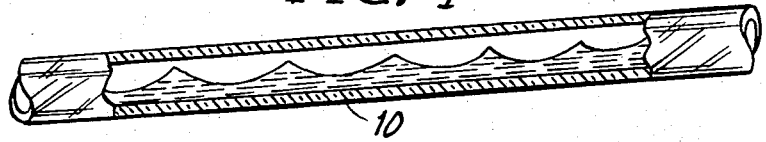
Fig. 4
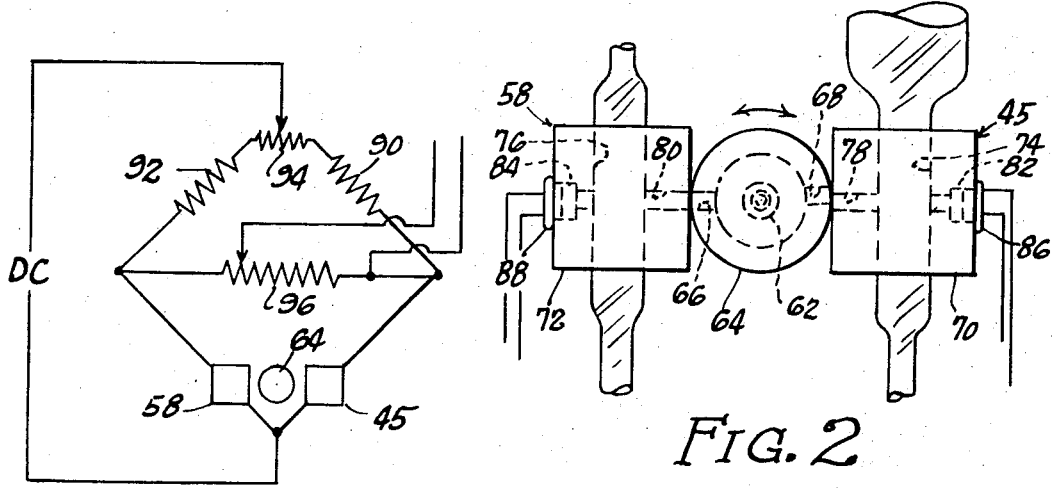
Fig. 3
Fig. 2

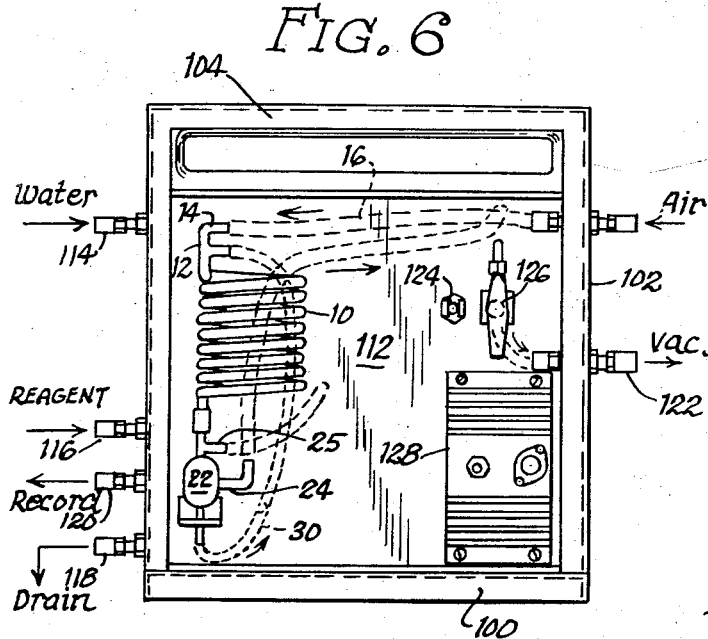
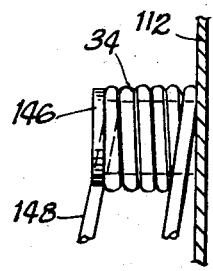
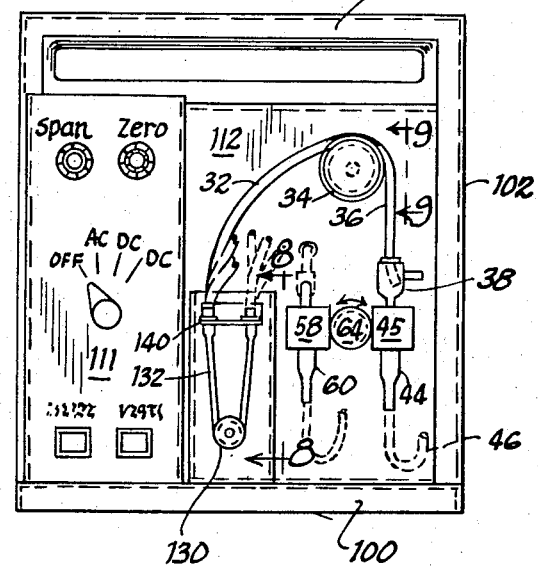

3,708,265
COLORIMETER FOR DETERMINING THE CONCENTRATION OF A POLLUTANT GAS IN AN AIR SAMPLE
Norman A. Lyshkow, Chicago, Ill., assignor to Pollution Monitors, Inc., Chicago, Ill.
Original application June 15, 1970, Ser. No. 46,308. Divided and this application Apr. 8, 1971, Ser. No. 132,614
Int. Cl. C01n 21/26
U.S. Cl. 23—254
20 Claims

ABSTRACT OF THE DISCLOSURE

This invention is addressed to a new and improved colorimeter for determining the concentration of gaseous pollutants in air and to improved scrubber and photocell assemblies for use with such colorimeters, wherein the scrubber includes a helical coil into which an air sample is drawn and admixed with a liquid absorbent whereby the liquid flows gravitationally through the coil in the form of wave fronts to provide complete contact between the air sample and the liquid absorbent with minimum agitation, and the photocell assembly includes a pair of spaced photoresistors and a light source spaced therebetween, with the light source having a lamp housing enclosing the light source and defining a pair of spaced openings whereby the light source projects optical spots to the photoresistors to illuminate the photoresistors with light, the relative intensity of which is dependent upon the color developed in solutions passed in front of the photoresistors as an indication of the pollutant gas concentration in the air sample.

---

This application is a division of my copending application Ser. No. 46,308, filed June 15, 1970, and entitled "Improved Colorimeter and Elements Therefor," now Pat. No. 3,617,136.

This invention relates to a new and improved colorimeter, and more particularly to a new and improved colorimeter for use in determining the content of various gases in air and to new and improved scrubber and photocell systems therefor.

Colorimeters and colorimetric methods for determining the content of various gases, such as sulfur dioxide and nitrogen dioxide pollutants, in air have been used for many years because of their sensitivity and accuracy. In general, such colorimetric methods involve absorbing the pollutant gas in an absorbent, and then reacting the absorbed gas with a chemical reagent or indicator for the development of color, the intensity of which is indicative of the pollutant concentration in the gas sample. For example, Greiss, in Bemerkungen veder abhandlung dur H. H. Werselsky und Benedi KT, "Veder Einige Azozerbingdungen," Ber. 12, 426 (1879), has described the azo dye formation in the presence of the nitrile ion in accordance with the following:

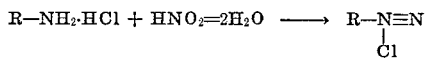

wherein R is an aromatic group such as phenyl or naphthyl. The intermediate compound is then reacted with a coupling compound in the form of an aromatic amine or phenol to form an azo dye having color which can be used as a basis for a colorimetric determination of the nitrite ion in accordance with the following:

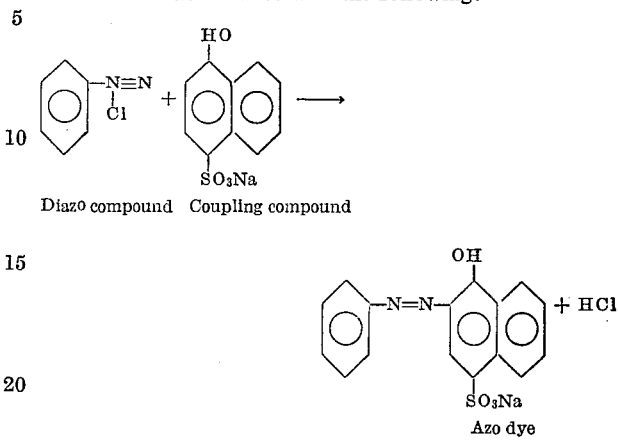

One of the first colorimetric methods based upon the foregoing reactions was described by Jacobs and Brody in "A Rapid Method for the Determination of Nitrogen Dioxide-Nitrogen Tetroxide within an Atmosphere," a paper presented at Met. N.Y. Sect. Am. Ind. Hyg. Assoc. (1945). However, the method as described was found to require about 30 minutes for optimum color development, which renders the method unsuitable for the continuous monitoring of nitrogen dioxide in air.

Substantial improvements in the foregoing colorimetric method have been described by Lyshkow in "A Rapid and Sensitive Colorimetric Reagent for Nitrogen Dioxide in Air, Journal of the Air Pollution Control Association, 15, pp. 481–4 (October 1955), in which description is made of a reagent composition containing N-(1-naphthyl) ethylene diamine hydrochloride, sulfamilic acid or sulfamilamide and 2-naphthol-3,6-disulfonic acid disodium salt as well as wetting agents and the like in aqueous medium. The reagent composition is thus capable of the development of color almost immediately on contact with nitrogen dioxide.

Suitable apparatus for carrying out the described colorimetric analysis includes an absorber or scrubber assembly and a photocell assembly including a pair of flow-through cells, a light source and a detector. The reagent solution is first drawn through one of the flow-through cells, and is then combined with a gas sample in the scrubber in which the gaseous nitrogen dioxide in air is intimately contacted with the reagent composition for reaction therewith for the development of color in the solution. The solution from the absorber is then passed through the other of the pair of flow-through cells. A light source is positioned on one side of the pair of cells and a pair of photoresistors on the other side. The imbalance between the photoresistor detectors caused by the difference in color between the unreacted reagent composition flowing through one cell and the reacted reagent composition flowing through the other cell generates a small signal which can be displayed in a conventional manner as an indication of the nitrogen dioxide concentration in the air sample.

One of the primary difficulties in the apparatus as described above is that the photocell assembly is susceptible to the effects of external light, and accordingly involves complex shielding problems. In addition, since the output of the device is measured in terms of the imbalance between the photo-resistors, the accuracy of the measurement decreases with time because of drift in the resistance of the photocells, thus requiring more frequent calibrations.

A method for determining $SO_2$ concentration in air using similar apparatus is described by Lyshkow in "The Continuous Analysis of Sulfur Dioxide in Gaseous Sample," Journal of the Air Pollution Control Association, 17, pp. 687-9, (October 1967) in which use is made of a reagent composition formulated to include pararosanaline which is capable of reacting with the sulfite ion for the development of color.

As is pointed out in the aforementioned article, one of the more difficult problems that exist with respect to colorimetric determinations of sulfur dioxide is that sulfur dioxide is oxidized to sulfur trioxide at a fairly rapid rate in the presence of oxygen and under high humidity conditions. For this reason, it is necessary to entrap the $SO_2$ in the reagent solution as rapidly as possible to prevent or substantially minimize oxidation of $SO_2$ and $SO_3$. Thus, when use is made of packed column scrubbers or the like for scrubbing $SO_2$ from air, in which there exists maximum agitation to facilitate intimate contact of the $SO_2$-containing air sample with the reagent composition, it is necessary to employ sodium tetrachloromercurate (II) as a trapping solution to prevent oxidation of $SO_2$ in the scrubber. The use of sodium tetrachloromercurate (II) is generally disadvantageous in that it is not completely stable over long periods of time, and it frequently causes staining of the photocells, thereby distorting the results of the analysis.

Thus, in order to avoid the use of sodium tetrachloromercurate (II), it is necessary to provide a scrubber system having minimal agitation and yet having maximum surface area to promote intimate contact of the $SO_2$ in the air sample with the reactive reagent solution.

One such scrubber is described in the aforementioned article, and is formed of a plurality of rotating discs which promote intimate contact with the $SO_2$ in the air sample with a minimum of agitation. However, the scrubber as described has a large volume, and consequently cannot be used as part of a compact, portable colorimeter assembly.

The photocell assembly as described in the aforementioned article is similarly subject to many of the same drawbacks as the photocell assembly described above with reference to the nitrogen dioxide. The $SO_2$ colorimeter photocell described includes a dual beam colorimeter to compare the relative percent transmission of the reacted and unreacted pararosanaline reagent solutions. As can be appreciated by those skilled in the art, the complex prism and filter systems which must be used with a dual beam colorimeter present a number of difficulties from the standpoint of manufacture and use. In addition, since the output of the photocell assembly is measured in terms of the imbalance of the photo-resistors, the photocell assembly is susceptible to the same drift characteristics described above as a result of temperature and light level instabilities.

It is accordingly an object of the present invention to provide a new and improved colorimeter for determining the content of various gases such as nitrogen dioxide and sulfur dioxide in air, and new and improved scrubber and photocell assemblies therefore, which overcome the aforementioned deficiencies.

It is a more specific object of the invention to provide a new and improved colorimeter of the type described which is light in weight and compact, and which is characterized by a high degree of accuracy.

It is another object of this invention to provide a new and improved colorimeter of the type described which is capable of analyzing the concentrations of various gaseous pollutants, such as nitrogen dioxide and sulfur dioxide, in air.

It is yet another object of the present invention to provide a new and improved scrubber assembly for use with a colorimeter of the type described which is characterized by minimum agitation and which is capable of promoting complete contact between the gaseous sample and the liquid reagent composition, without the need to employ auxiliary trapping components.

It is a further object of the present invention to provide a new and improved photocell assembly for use with a colorimeter of the type described which is simple to manufacture and use; which has negligible drift in response to variations in light and/or temperature; and, which requires less frequent calibrations.

These and other objects and advantages of the present invention will appear more fully hereinafter, and for purposes of illustration, but not of limitation, an embodiment of the invention is shown in the accompanying drawings in which:

FIG. 1 is a schematic illustration of a colorimeter embodying the features of the present invention;

FIG. 2 is a detailed view of a photocell assembly embodying the features of the invention;

FIG. 3 is a schematic view of the circuit of the photocell assembly illustrated in FIG. 3;

FIG. 4 is a view, partially in section, showing the liquid profile as it flows through scrubber of the present invention;

FIG. 5 is a perspective view of a colorimeter embodying the features of the invention built into a casing;

FIG. 6 is a side view of the internal workings of the instrument shown in FIG. 5, illustrating the scrubber assembly;

FIG. 7 is a side view of the internal workings of the instrument shown in FIG. 5, viewed from the opposite side;

FIG. 8 is a view taken along the lines 8—8 in FIG. 7; and,

FIG. 9 is a view taken along the lines 9—9 in FIG. 7.

The concepts of the present invention reside in a new and improved colorimeter for determining the concentration of various pollutant gases, such as sulfur dioxide or nitrogen dioxide, in air, which includes a scrubber or absorber assembly for absorbing the pollutant gas from an air sample including means for mixing a chemical reagent composition which is capable of the development of color on reaction with the pollutant gas absorbed in aqueous media and a photocell assembly for measuring the development of color in the reagent composition.

One of the features of the present invention resides in the scrubber assembly which includes a helical coil of capillary tubing in which the axis of the helix lies in a substantially vertical plane. The helical coil is provided at its upper end with a tubular portion extending therefrom which is open at its end and which is adapted to receive an air sample to be analyzed. The tubular portion of the coil is provided, at an intermediate distance between the helix of the coil and the open end, with inlet means through which an aqueous absorption media or chemical reagent composition can be fed to contact the gas sample in the helical portion of the coil to absorb the pollutant gas therefrom.

The lower end of the helical coil is provided with a downwardly extending tubular portion which terminates in a gas-liquid separating bulb. The downwardly extending portion can be provided with means to introduce thereto the reagent composition at an intermediate distance between the coil and the separating bulb whereby the reagent composition is admixed with the aqueous absorbent containing the pollutant gas for reaction therewith in the case of $SO_2$ analysis. In the case of $NO_2$ analysis, the reagent composition is used as the absorbent, and, thus, the means for adding the reagent to the liquid issuing from the coil may be omitted for $NO_2$ analysis and the reagent composition fed to the upper tubular portion as the absorbent.

The helical coil is formed of tubing having a relatively small diameter, and the coils of the helix are inclined at a slight angle such that the aqueous media flow smoothly therethrough without turbulence. It has been found that the liquid profile of the aqueous media flowing therethrough is in the form of liquid fronts or waves which facilitates intimate contact between the pollutant gas-containing air sample and the aqueous absorbent with essentially no agitation. In this way, when the colorimeter is being used for analysis of the $SO_2$ content of an air sample, oxidation of $SO_2$ and $SO_3$ is prevented or substantially minimized to thereby provide greater accuracy. In addition, intimate contact between the absorbent and the gas sample is assured.

Without limiting the invention as to theory, it is believed that the liquid wave from or profile of flow through the helical portion of the coil is due to a combination of the effects of the air flow, the wetting properties of the aqueous absorption media, the angle of inclination of the coil and, perhaps most significantly, the inside diameter of the tubing forming the coil. It has been found that best results are achieved when the diameter of the coil is within the range of 3 to 4 millimeters.

Another feature of the present invention resides in the photocell assembly in which complex prism systems and filter systems have been eliminated. In accordance with the practice of the invention, the photocell assembly includes a pair of opposing photoresistors in alignment on opposite sides of a suitable light source or lamp. Between each photoresistor and the light source, there is positioned transparent tube means through which the reacted and unreacted reagent compositions can flow such that the light must pass through each liquid composition before impinging on each photo-resistor.

The light source or lamp is covered by a cylindrical housing having a pair of openings therein, which is rotatable about an axis which lies in the path of travel of the light from the lamp. The openings in the housing are not diametrically spaced about the peripheral surface of the housing, but one of the openings is spaced from the other by a distance slightly less than 180°. Thus, each photoresistor cannot be subjected to the full intensity of the light source simultaneously since the housing serves to slightly reduce the intensity of light exposed to one photoresistor when the other is subjected to the full intensity of the source. Thus, the relative intensity of light to which each photoresistor is subjected can conveniently be adjusted by rotating the housing about its axis, whereby an optical spot is projected from the lamp source through the openings in the housing of the lamp to each photocell to avoid filament color, and to permit balancing of each of the photoresistors prior to use, thereby minimizing required calibrations.

Each photoresistor and adjacent tube means is provided with a housing having an opening therethrough which is aligned with the light source and through which the optical spots projected through the openings in the lamp housing may pass. In this way, the photoresistors are rendered insensitive to external light. If it is desired to make use of color filters or the like, such filters may be interposed between the tube means and photoresistors in each photoresistor housing.

Referring now to the drawings, there is shown in FIG. 1 a schematic illustration of the apparatus of the present invention. The colorimeter includes a scrubber tube in the form of a helical coil 10 having a substantially vertical axis such that each portion of the helix is inclined at a slight angle to facilitate gravitational flow of liquid through the coiled tubing without turbulence. The upper portion of the coil is provided with a substantially vertical portion 12 which is bent about a right angle at its uppermost portion 14 and which is open at the end to receive an air sample supplied thereto by means of suitable tube means 16 which may, if desired, terminate in a filter (not shown) to remove particulate matter from the air sample to be analyzed.

Intermediate between right angle portion 14 and coil 10, there is provided a nipple 18 communicating with the interior of hollow tubing 12 for the introduction of aqueous absorption media for contact with the gas sample in the coils of helix 10.

The lower portion of the helical coil 10 is provided with a substantially vertical downwardly extending portion 20 which terminates in a gas-liquid separation chamber 22 in the form of a bulb having an expanded diameter. Bulb 22 is provided in one sidewall thereof with nipple means 24 which is adapted to be connected to a suitable vacuum source to draw the air sample down through helical coil 10 for contact with the absorption media.

Vertical portion 20 is also provided with suitable means 25 in the form of a nipple for the introduction of a reagent composition for admixture with the absorbent containing the pollutant gas absorbed therein in mixing bulb 22.

The bulb 22 terminates in a nipple 26 which is connected with a suitable pump 28, which is preferably a peristaltic pump capable of pumping three separate liquids simultaneously, by tube means whereby the contents of bulb 22 flow through nipple 26 through tube means 30 to pump 28 from which the liquid is pumped through line 32 preferably to a time delay coil 34 which is a coil of hollow tubing which serves to increase the time required for the liquid flowing from mixing bulb 22 to reach the photocell assembly to enable the reaction between the absorbed pollutant gas and the reagent composition to take place. The outlet of time delay coil 34 is connected to the photocell assembly by means of tube means 36.

The liquid issuing from time delay coil 34 is preferably passed through line 36 to a gas liquid separator 38 which can be in the form of a bulb 40 into which extends a tube 42 in abutting relation with the wall of bulb 40 whereby the liquid flows down the wall of bulb 40 into the tube means 44 for passage through one cell 45 of the photocell assembly into tube 46, which is also provided with a vent 48 for passage to a drain.

The apparatus of the present invention also includes tube means for supplying aqueous absorbent to pump 28, from which the absorbent is pumped via tube means 52 to nipple 18 for introduction of the absorbent into the scrubber. Also included is tube means 54 for passage of the reagent composition which is capable of reaction with the absorbed pollutant gas for the development of color to pump 28, and tube means 56 for passage of the reagent composition to the other or reference cell 56 whereby the reagent composition flows through tube means 60 for passage through reference cell 58 and through tube means 62 for admixture with the absorbent containing the pollutant gas absorbed therein.

The photocell assembly is shown in greater detail in FIG. 2 of the drawing, including a lamp or light source 62 which is enclosed by a cylindrical housing 64 having a pair of openings 66 and 68 spaced about the periphery of the lamp housing. As pointed out above, openings 66 and 68 are spaced from each other by a distance slightly less than 180° about the periphery.

Positioned on either side of the enclosed light source 62 is a pair of opposing photocell housing 70 and 72, each having a central opening therethrough designated as 74 and 76, respectively, adapted to receive transparent tubes 44 and 60, respectively, extending therethrough and adapted to contain the reagent composition which has been reacted with the absorbed pollutant gas and unreacted reagent composition, respectively.

Each of the photocell housing 70 and 72 is also provided with a second central opening 78 and 80 extending therethrough in a direction which is substantially transverse to direction of central recesses 74 and 76, respectively. As shown in FIG. 2, each of the second central recesses 78 and 80 terminates in opposing recesses 82 and 84, each of which is adapted to receive a photoresistive cell such as a cadmium sulfide photoresistive cell 86 and 88, respectively, the electrical resistances of which are dependent upon the intensity of light to which they are exposed. As is also shown in this figure, the second central recesses 78 and 80 are in axial alignment each with the other, and the light sources is in alignment with the axis thereof.

Thus, the resistance of each cell can be balanced against the other by rotating the lamp housing 64 about its axis prior to the time that tube 44 contains the reagent composition which has been reacted with the absorbed pollutant gas to compensate for variations in the resistance of each photoresistor cell due to the effects of temperature and light level. Because this balance can be achieved before and/or during each use, if desired, there is less drift in the resistance of the system, and hence frequent calibrations are not required. As will be appreciated by those skilled in the art, because of the fact that the openings in the lamp housing 66 and 68 are slightly offset from being diametrically opposed, the relative intensity of the optical spots projected through openings 68 and 66 to photoresistors 86 and 88, respectively. For best results, openings 68 and 66 should be spaced about 170° about the periphery of housing 64.

The potentiometer circuit for the photocell system is schematically illustrated in FIG. 3 of the drawings. As shown, the photoresistors 58 and 45 constitute the resistors on the lower branches of a Wheatstone bridge, which also includes a pair of fixed resistors 90 and 92 and a variable resistor 94 at the apex which can be varied to zero the potentiometer prior to use. The bridge is connected to a suitable D.C. source, and the output of the potentiometer is the voltage across variable resistor 96. When the photoresistors 45 and 58 are in balance, the voltage output is zero. As will be understood by those skilled in the art, the output of the potentiometer can be displayed on a plotting recorder or the like if desired.

In use for $SO_2$ analysis, the pump is started to pump the reagent solution from a reservoir (not illustrated) through pump 28 and into tube 60 for passage through reference photocell 58 and to pump the aqueous absorption medium from a reservoir (not illustrated) through line 50 to pump 28 and through line 52 for passage of the absorbent through coil 10 into mixing bulb 22 in which it is mixed with the reagent composition which has been simultaneously pumped from photocell 58 to separating bulb 22. After the system has reached a steady state condition, the lamp housing 64 is roated until the photocell system is in balance such that the voltage output across resistor 96 is zero.

During the balancing of the photocells as described above, the vacuum is applied at nipple 24 on separating bulb 22 whereby the vacuum thus created serves to draw in an air sample which has been filtered to remove pollutants through line 16 and into portions 14 and 12 of helical coil 10 where the air sample is contacted with the aqueous absorbent fed to portion 12 through line 52 from pump 28.

Thereafter, the filter is removed from line 16 so that a pollutant gas-containing air sample is drawn in the absorber. As the air sample and the aqueous absorption medium are mixed in helical coil 10, a wave form profile of liquid flow is created and the liquid wave fronts or forms flow smoothly through coil 10 as shown in FIG. 4 whereby the gaseous and liquid phases are intimately admixed with essentially no agitation to promote absorption of the pollutant gas in the absorbent.

As the absorbent containing absorbed pollutant gas flows from coil 10 down into the lower vertical portion 20, the absorbent solution is admixed with the reagent composition introduced at nipple 25 and air is withdrawn in separating bulb 22. The resulting mixture of reagent composition and pollutant gas-containing absorbent is pumped out of bulb 22 from the bottom thereof with no accumulation of liquid in bulb 22, and perferably with over pumping to draw air and the mixture, to pump 28 via line 30 from which it is pumped through line 32 and time delay coil 34 and onto gas separator 38, during which the reaction between the absorbed pollutant gas and the reagent composition.

In secondary gas-liquid separator 38, the liquid phase flows through tube 42 into the separator 40 and down the walls thereof for passage through the measuring photocell 45, while any gas (air) which is not withdrawn from the system in separating bulb 22 is vented. The liquid passed through tube 44 in the photocell 45 is discharged through line 46.

Simultaneously, pump 28 causes the aqueous absorbent to continuously flow from the reservoir to coil 10 for introduction thereto at nipple 18, and causes the reagent composition to flow through line 56 for passage through tube 60 in the reference photocell 58 and back through line 62 for introduction to mixing bulb 22 at nipple 25.

It will thus be apparent that after the air sample is drawn into the apparatus, the pollutant gas is absorbed by the absorbent for reaction with the reagent for the development of color. The colored solution is continuously passed through measuring cell 45 while the unreacted reagent composition is simultaneously and continuously passed through reference cell 58 whereby the light source projects optical spots through each solution onto each of the respective photocells. The colored solution containing the reaction product of the reagent composition and the absorbed pollutant gas transmits less light to the photoresistor of cell 45, thereby creating an imbalance in the resistance of the photoresistors. This imbalance causes a current to flow through resistor 96 of the potentiometer, and thus creates a voltage signal, the magnitude of which is indicative of the concentration of the pollutant gas in the air sample. As will be appreciated, resistor 96 can be calibrated with a standard air sample containing a known quantity of the pollutant gas.

The apparatus of the present invention can also be used for the analysis of $NO_2$-containing air samples. As indicated above, however, in $NO_2$ analysis, the reagent composition is used as the liquid absorption medium. Thus, tubing 62 which carries the unreacted reagent composition issuing from photocell 58 is removed from nipple 25 and placed on nipple 18 so that the unreacted reagent composition is pumped directly to the coil as the absorption medium. The operation of the device is otherwise the same as described.

The apparatus of the present invention is particularly well suited for monitoring, either continuously or intermittently, the $SO_2$ content in air using water as an absorbent or $NO_2$ using the reagent composition as an absorbent. The colorimeter of the invention is capable of providing accurate and reproducible readings, and has a sensitivity for detecting and measuring pollutant gas concentration as low as 5 parts per billion.

Reagent compositions capable of reacting with the foregoing pollutant gases are known to the prior art as represented by the Lyshkow references cited above, and may be illustrated by the following examples.

EXAMPLE 1

Reagent and absorbent composition for $NO_2$

N - (1 - naphthyl)ethylene diamine dihydrochloride _____ g__ 0.050
2-naphthol-3,6-disulfonic acid disodium salt __g__ 0.050
Sulfamilamide _____ g__ 1.500
Tartaric acid _____ g__ 15.0
Kodak "Photoflow" wetting agent _____ ml__ 0.25
Deionized water, q.s. 1 liter.

EXAMPLE 2

Reagent composition for SO₂

| | | |
|---|---|---|
| Aqueous solution HCl (weight ratio 1:1) | ml | 640 |
| Pararosanaline(Fisher P-389) | g | 0.800 |
| Formaldehyde (37% solution) | ml | 22 |
| Waco wetting agent | ml | 40 |
| Water, a.s. 20 liters. | | |

It is generally desirable to permit the foregoing reagent composition to stand for 12 hours prior to use. For a more detailed description of these reagent compositions and method for their preparation, reference can be made to the aforementioned articles.

One of the primary advantages of the apparatus of the present invention, in addition to the improved accuracy as described above, is that the colorimeter of the invention is relatively light in weight, compact and can easily be built into a portable case of the type shown in FIGS. 5 to 9 of the drawing.

As shown in FIG. 5 of the drawings, the casing includes a base 100 which is provided with a vertical frame member 102 having at its uppermost portion a carrying handle 104. In the embodiment shown in this figure, the frame member 102 extends across the base longitudinally at about the center of the base whereby the base 100 and frame define an inverted T-shaped chassis.

The working parts of the colorimeter are encased in a pair of removable covers on the forward and rearward sides of the device 106 and 108, respectively, which serve to protect the working parts. Cover 106 on the front of the device is provided with a suitable opening 110 in the face thereof to permit access to the control panel 111.

The rearward side of the device with the cover 108 removed is shown in FIG. 6 of the drawings. As is illustrated in this figure, the scrubber assembly including the helical coil 10 and separating bulb 22 is mounted on the face 112 of vertical frame member 102 such that the axis of coil 10 is substantially vertical. Associated tubing for supplying the various components to the system are also shown in this figure.

It is frequently desirable to make use of external sources of absorbent, reagent, draining, etc. For this purpose, the frame member 102 is provided with suitable connecting means 114, 116 and 118 which are connected by means of tubing (not shown) to the various working parts of the device. Also included is connecting means 120 to connect the output of the device with a recorder or the like. In addition, the device of the invention is also provided with dual connecting means 122 and 124 which can be connected to a source of vacuum such as a vacuum pump. Thus, if an external vacuum source is to be used, the vacuum can be connected at 122 and valve 126 turned to an open position at which the path from nipple 25 of bulb 22 runs through valve 126 to coupling means 122. However, if desired, the device of the invention can be provided with its own vacuum source connected to coupling 124. In this event, valve 126 is closed and the vacuum is applied at 124.

The face 112 of vertical frame member 102 can also be provided with means 128 which is capable of converting A.C. to D.C. so that use can be made of ordinary 60 cycle 110 volt current, if desired. In the preferred embodiment of the invention, the colorimeter is capable of being operated on either A.C. or D.C. current, either external or internal.

The forward side of the device with protective cover 106 removed is shown in FIG. 7 of the drawing. As illustrated, mounted on the face 112 of the vertical frame member 102 is the control panel 111, behind which is located the electronic workings of the colorimeter.

Also mounted on the face 112 are the photocell assemblies including reference cell 58, lamp housing 64 and measuring cell 44, the peristaltic pump 130 and the time delay coil 34 as well as the tube means associated with these components.

The peristaltic pump 130 is shown in greater detail in FIG. 8 of the drawing, and includes for each liquid to be pumped a flexible tube 132, 134 and 136, each of which is supported by a L-shaped bracket 140 mounted on face 112 and which pass under a pulley 142 provided with a plurality of sharp edges about the periphery which is driven by suitable means such as an electric motor 144. As is known to those skilled in the art, as pulley 142 is driven, the sharp edges on the periphery thereof force the liquid through each of the tubes 132, 134 and 136 by virtue of the peristaltic closing of the flexible tube. Such pumps per se and the method by which they operate are known to the art.

The time delay coil 34 is shown in greater detail in FIG. 9 of the drawing. As illustrated in this figure, the coil is formed by a length of tubing 148 wrapped about a hub 146 fixed to face 112 of vertical frame member 102. As will be appreciated by those skilled in the art, the number of turns on hub 146 will depend for the most part on the length of the tubings 30, 32 and 36 connecting the mixing bulb 22 with tube 44 of measuring cell 45.

It will be apparent from the foregoing description that I have provided a new and improved colorimeter, and scrubber and photocell assemblies for use with same, which can be used in a simple and efficient manner to determine the concentration of various gases in air or other inert gases to provide accurate and dependable measurements.

It will be understood that various changes and modifications can be made in the details of construction, procedure formulation and use without departing from the spirit of the invention, especially as defined in the following claim.

I claim:

1. A colorimeter for determining the concentration of a pollutant gas in an air sample comprising a scrubber, said scrubber including a helical coil of tubing having a relatively small diameter mounted on a vertical axis, the upper portion of the coil having a first tubular portion extending therefrom terminating in means for introduction of an air sample thereto and the lower portion of the coil having a second tubular portion extending therefrom and terminating in a separating bulb, means on said first tubular portion at a distance intermediate between said means for introduction of an air sample and the upper portion of the coil for introducing a liquid absorbent into said first tubular portion for admixture with the air sample in said coil, means for applying a vacuum to said coil to draw an air sample into said coil; a photocell assembly, said photocell assembly including a pair of spaced opposing cell housings, each of said cell housings defining a central opening therethrough adapted to receive tube means for passage of a liquid therethrough and defining a second opening transverse to said central opening terminating in a recess adapted to receive a photoresistor on opposing faces of said housings, a photoresistor in each recess, a light source between said cell housings and adjacent thereto, transparent tube means extending through each of said central openings between said light source and said photoresistors wherein one of said tube means in one of said cells is adapted to contain a reagent composition which is capable of the development of color on contact with the pollutant gas prior to contact with the pollutant gas and the other of said tube means in the other of said cells is adapted to receive said reagent composition which has been reacted with the pollutant gas, and a lamp housing defining a pair of spaced openings therethrough whereby said light source is adapted to project optical spots through each of said tube means onto said photoresistors; means for passing unreacted reagent composition through said one of said tube means in one of said cell housings and to said coil and means for feeding the liquid in said separating bulb to the other of said tube means in the other of said cell housings whereby the pollutant gas is absorbed in the liquid absorbent and reacted with the reagent composition for the development of color, the intensity of which is measured by said photocell assembly to determine the concentration of the pollutant gas in the air sample.

2. A colorimeter as defined in claim 1 wherein said coil is formed of capillary tubing.

3. A colorimeter as defined in claim 1 wherein said coil is formed of tubing having an inside diameter within the range of 3 to 4 millimeters.

4. A colorimeter as defined in claim 1 wherein the tubing forming the coil is inclined at an angle sufficient to cause gravitational flow of a liquid absorbent therethrough with no turbulence.

5. A colorimeter as defined in claim 1 wherein said lamp housing is a substantially cylindrical housing having said openings on the peripheral surface thereof whereby the resistance of each of the photoresistors can be balanced by rotating the lamp housing to vary the relative intensity of light projected through the openings in said lamp housing.

6. A colorimeter as defined in claim 5 wherein said openings in said lamp housing are spaced about the periphery of the cylindrical housing by a distance of about 170°.

7. A colorimeter as defined in claim 1 wherein the said second opening in each of said cell housing is in axial alignment with the other.

8. A colorimeter as defined in claim 7 wherein said light source is positioned between said cell housings coincident with the axis of said second openings in said cell housings.

9. A colorimeter as defined in claim 1 which includes a color filter in said recess of each cell housing interposed between said tube means and said photoresistor.

10. A colorimeter as defined in claim 1 which includes means to supply a chemical reagent to said coil on said second tubular portion at a distance intermediate between the lower portion of said coil and said separating bulb.

11. A colorimeter as defined in claim 10 which includes a 3-phase peristaltic pump to pump the liquid absorbent, the reagent composition and the liquid issuing from said separating bulb through the system.

12. A colorimeter as defined in claim 1 wherein said means for feeding the liquid in said separating bulb to the other of said tube means includes a time delay coil to increase the time required for the liquid to reach said other of said tube means by an amount sufficient to permit complete reaction between the absorbed pollutant gas and a reagent composition.

13. A colorimeter for determining the concentration of a pollutant gas in an air sample comprising a base, a vertical frame member mounted on said base defining forward and rearward faces, a scrubber mounted on one of said faces, said scrubber including a helical coil of tubing having a relatively small diameter mounted on a vertical axis, the upper portion of the coil having a first tubular portion extending therefrom terminating in means for introduction of an air sample thereto and the lower portion of the coil having a second tubular portion extending therefrom and terminating in a separating bulb, means for supplying a liquid absorbent into said first tubular portion for admixture with the air sample in the coil, and means for applying a vacuum to said coil to draw an air sample into said coil; a photocell assembly mounted on the other of said faces, said photocell assembly including a pair of spaced opposing photocells, each of said pairs containing transparent tube means extending therethrough wherein one of said tube means in one of said cells is adapted to contain a reagent composition capable of the development of color on reaction with the pollutant gas prior to contact with the pollutant gas and the other of said tube means in the other of said cells is adapted to receive the reagent composition which has been reacted with the pollutant gas whereby each of the photocells is adapted to be illuminated by a light source to measure the difference in light intensity passing through said tube means to measure the concentration of the pollutant gas in the air sample; pump means mounted on one of said faces, said pump means including means for passing unreacted reagent composition through one of said tube means in one of said photocells and to said coil, means for supplying a liquid absorbent to said coil and means for pumping the liquid issuing from said separating bulb to the other of said tube means in the other of said photocells whereby the pollutant gas is absorbed in the liquid absorbent and reacting with the reagent composition for the development of color, the intensity of which is measured by said photocell assembly to determine the concentration of the pollutant gas in the air sample.

14. A colorimeter as defined in claim 13 which includes a time delay coil as part of said means to feed the liquid issuing from said separating bulb to the other of said tube means of said photocell whereby the residence time of the liquid from said separating bulb is increased by an amount sufficient to permit complete reaction of the pollutant gas with said reagent composition for the development of color.

15. A colorimeter as defined in claim 13 wherein said pump means includes a peristaltic pump.

16. A colorimeter as defined in claim 13 which includes potentiometer means to measure the relative resistance of said photocells, said potentiometer means being mounted on said base.

17. A colorimeter as defined in claim 13 which includes a removable housing to protect the colorimeter.

18. A colorimeter as defined in claim 13 which includes means to supply a chemical reagent to said coil on said second tubular portion at a distance intermediate between the lower portion of said coil and said separating bulb.

19. A colorimeter as defined in claim 17 wherein said housing is formed by two housing elements, each of said elements being adapted to enclose each of said faces.

20. A colorimeter as defined in claim 13 wherein said photocell assembly includes a pair of spaced opposing cell housings, each of said cell housing defining a central opening therethrough adapted to receive said tube means for passage of a liquid therethrough and defining a second opening transverse to said central opening terminating in a recess adapted to receive a photoresistor on opposing faces of said housing, a photoresistor in each recess, a light source between said cell housings and adjacent thereto, and a lamp housing enclosing said light source and defining a pair of spaced openings therethrough whereby said light source is adapted to protect optical spots through each of said tube means onto said photoresistors.

References Cited
UNITED STATES PATENTS
3,345,910 10/1967 Rosin et al. _____ 356—181

RONALD L. WIBERT, Primary Examiner

O. B. CHEW II, Assistant Examiner

U.S. Cl. X.R.

23—253 R; 250—218; 356—181, 208